United States Patent
Sethi et al.

(10) Patent No.: US 10,652,109 B1
(45) Date of Patent: May 12, 2020

(54) PROVIDING MACHINE LEARNING ASSISTANCE FOR TECHNICAL SUPPORT

(71) Applicant: Dell Products L. P., Round Rock, TX (US)

(72) Inventors: Parminder Singh Sethi, Ludhiana (IN); Mohith Shanthigodu, Kariyangala (IN); Durai Singh, Bengaluru (IN); Vivekananda Hegde, Bengaluru (IN); Smita Kapil, Bengaluru (IN); Elanjelian V, Pondicherry (IN)

(73) Assignee: Dell Products L. P., Round Rock, TX (US)

( * ) Notice: Subject to any disclaimer, the term of this patent is extended or adjusted under 35 U.S.C. 154(b) by 0 days.

(21) Appl. No.: 16/173,511

(22) Filed: Oct. 29, 2018

(51) Int. Cl.
*H04L 12/24* (2006.01)
*G06N 20/00* (2019.01)

(52) U.S. Cl.
CPC ......... *H04L 41/5032* (2013.01); *G06N 20/00* (2019.01); *H04L 41/0654* (2013.01); *H04L 41/16* (2013.01); *H04L 41/22* (2013.01); *H04L 41/5074* (2013.01); *H04L 41/12* (2013.01)

(58) Field of Classification Search
CPC . H04L 41/5032; H04L 41/16; H04L 41/5074; H04L 41/12; G06N 20/00
See application file for complete search history.

(56) References Cited

U.S. PATENT DOCUMENTS

| | | | |
|---|---|---|---|
| 10,162,693 B1 * | 12/2018 | Contino | G06F 11/0748 |
| 2002/0138786 A1 * | 9/2002 | Chefalas | G06F 8/61 714/37 |
| 2003/0055804 A1 * | 3/2003 | LaButte | G06Q 10/06 706/50 |
| 2019/0163464 A1 * | 5/2019 | Compton | G06F 8/65 |
| 2019/0220695 A1 * | 7/2019 | Nefedov | G06K 9/6218 |

* cited by examiner

*Primary Examiner* — Mohamed A. Wasel
(74) *Attorney, Agent, or Firm* — Campbell Stephenson LLP; Shiv S. Naimpally

(57) ABSTRACT

In some examples, after a client system encounters a problem, a technical support specialist may connect to the client system via a console. The console may display a graphical representation of a client system that includes a plurality of components. The console may execute a machine learning module to determine one or more potential solutions to the particular problem. Each solution of the one or more solutions may correspond to a previously resolved problem that is similar to the particular problem and may have an associated confidence level determined based on: a similarity of the particular problem to the previously resolved problem, a similarity of the plurality of components to a second plurality of components included in a second client system associated with the previously resolved problem, a similarity of a network topology of the client system to a second network topology of the second client system.

20 Claims, 4 Drawing Sheets

PROVIDING MACHINE LEARNING ASSISTANCE FOR TECHNICAL SUPPORT

BACKGROUND OF THE INVENTION

Field of the Invention

This invention relates generally to computing devices and, more particularly, to providing, using machine learning, assistance to technical support.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Companies that provide computing-related products and services are often selected by customers at least in part based on their customer support and their ability to quickly resolve issues. This is true for both enterprise customers and individual customers. Debugging enterprise customer's issues can be particularly time consuming because of the complexity of enterprise networks. Often customers with similar configurations may encounter the same (or similar) issues and multiple technicians may end up, unknown to the others, working on the same or similar problem for different customers. For example, a first technician that is solving an issue for a first customer may be unaware that a second technician solved the same (or similar) problem for a second customer. Such a situation results in a waste of time and effort.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may connect a console hosted by the server to a client system that is experiencing a particular problem. The server may receive data gathered by one or more agents in the client system. The server may display a graphical representation of the client system (e.g., based on the data). For example, the graphical representation of the client system may include a plurality of components, a device type (e.g., server, router, switch, or the like) of each component of the plurality of components, a connection between at least a first device and a second device of the plurality of components, and a status (e.g., operational, non-operational, or intermittent) of the connection. The plurality of components may include at least one server, at least one network attached storage device, and at least one of either a network switch or a network router. Each component of the plurality of components may have a corresponding set of attributes. The server may receive a component selection selecting one or more components of the plurality of components, receive an attribute selection selecting a subset of the set of attributes associated with individual components of the one or more components, and display a revised graphical representation of at least a portion of the client system based at least in part on the component selection and the attribute selection. The server may perform a comparison of recently gathered data associated with the client system with previously gathered data associated with the client system and provide a comparison report identifying differences between the recently gathered data and the previously gathered data. For example, the comparison report may be used to determine additional details associated with the particular problem. The server may identify the plurality of components and a network topology of the client system based on the data received from the client system. The server may perform a comparison of the data with other data associated with other client systems to determine one or more similar client systems and identify a portion of the one or more similar client systems having problems similar to the particular problem. The server may execute a machine learning module to determine one or more potential solutions to the particular problem. Each solution of the one or more solutions may correspond to a previously resolved problem that is similar to the particular problem. The server may display, the one or more solutions. Each solution of the one or more solutions may have an associated confidence level. For example, the confidence level may be determined based on: (i) a similarity of the particular problem of the client system to the previously resolved problem, (ii) a similarity of the plurality of components of the client system to a second plurality of components included in a second client system associated with the previously resolved problem, (iii) a similarity of a network topology of the client system to a second network topology of the second client system associated with the previously resolved problem, or any combination thereof. Each solution of the one or more solutions may identify a technician that resolved the previously resolved problem, an experience level of the technician, and contact information associated with the technician.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
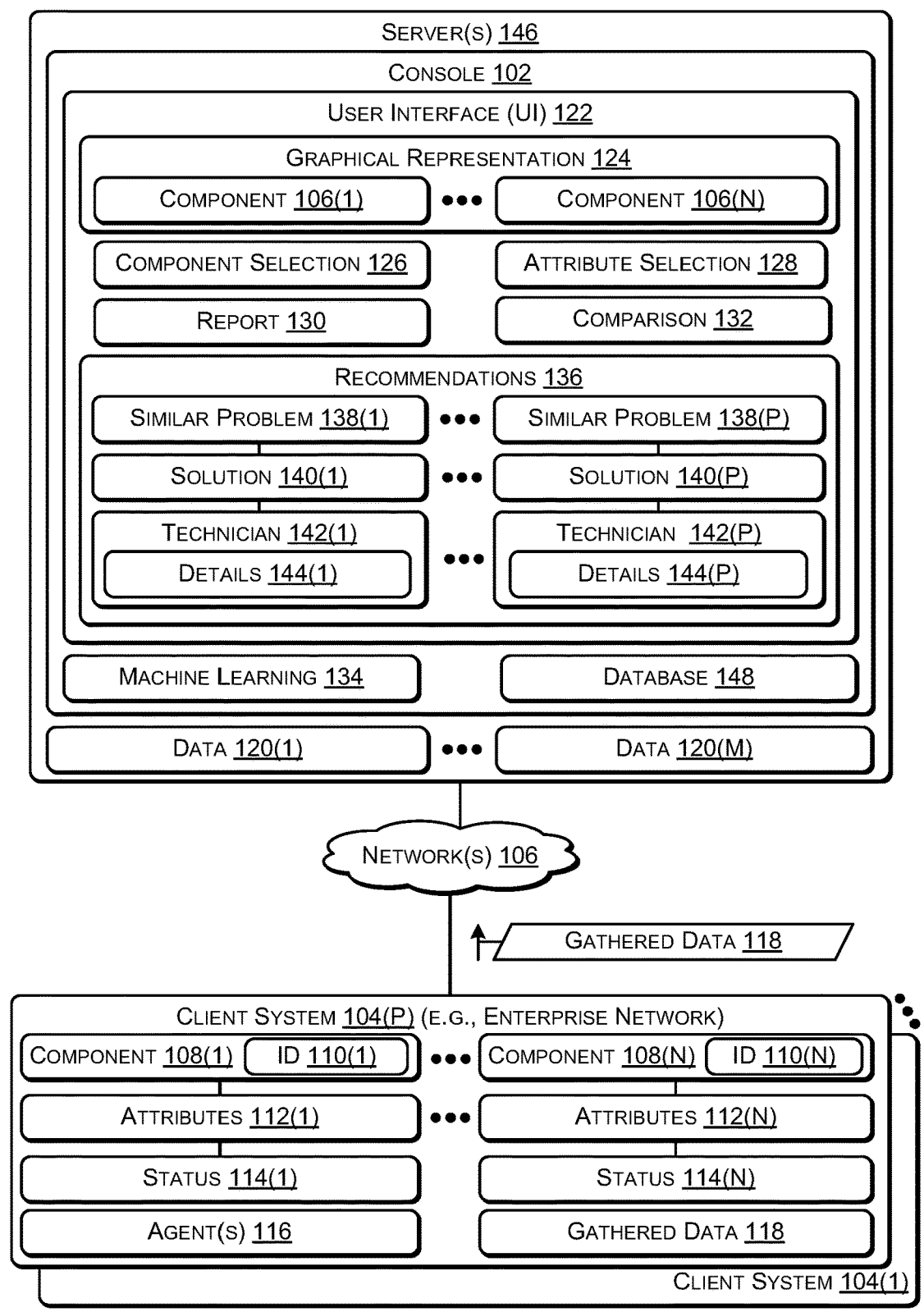
FIG. 1 is a block diagram of a system that includes a console connected to a client system, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide a graphical representation of a client system based on data associated with the client system, enable the graphical view to be filtered based on one or more selected components of the client system and one or more selected attributes of each selected component, and enable a machine learning algorithm to predict one or more solutions based on previous solutions to the same (or similar) problems encountered with other client systems. In this way, complex client systems may be easily debugged to quickly identify and resolve issues.

The systems and techniques may use a tool, such as a support assistance console ("console"), to access diagnostic information associated with a client system (e.g., an enterprise network). For example, one of more agents (e.g., software agents) installed in the client system may gather data (e.g., diagnostic information, logs, configuration information, and the like) associated with each component of the client system. For example, a client system may include routers, network switches, storage devices, servers, computers, network security appliances, and the like). Each component may have multiple attributes, such as, for example, which port on one component is connected to which port on another component, configuration information, error messages, currently installed firmware version, currently installed software version, hardware version, installation logs, error logs, and the like. The one or more agents may gather data (e.g., diagnostic information), including the attributes of each component in the client system in response to a particular event or periodically (e.g., at a predetermined time interval, such as every day, every week, every month, or the like). For example, a network link may enable one component to communicate (e.g., send and/or receive data) with another component of the client system. If the network link stops functioning, causing network traffic to be re-routed across other network links, then such an event may cause the one or more agents to gather data associated with each component of the client system. After the one or more agents gather the data associated with the client system, the agents may send the gathered data to a server of a company (e.g., Dell®, or the like) providing technical support services. As another example, if the one or more agents determine that a particular component of the client system is not functioning properly, the agents may automatically collect and upload (e.g., sent from the client system to the support company's server) diagnostic information associated with the particular component. In addition, a customer or a technical support specialist may manually initiate the collection and upload of diagnostic information associated with the client system.

When a client system encounters a problem, a technical support specialist ("technician") may connect to the client system via the console. The console may display a graphical representation of the client system based on gathered data, including the components of the client system and select attributes of the client system. For example, if a communications link is functioning properly between two components, then a colored (e.g., green) line may be displayed between the two components. If a communications link is not functioning properly between two components, then a different colored (e.g., red) line may be displayed between the two components. The graphical representation may be based on data that was most recently gathered by the agents. For example, when the console connects to the client system, the console may determine a timestamp associated with the most recently gathered data. If the timestamp is greater than a predetermined time interval (e.g., more than one hour, one day, one week, or the like) then the agents may be instructed to gather and upload (e.g., to the server) system information associated with the client system.

For components of the client system that have issues, the console may display status information (e.g., icons or the like) for the attributes. The console may automatically compare the most the most recent diagnostic information with previously gathered and uploaded diagnostic information associated with the client system and display differences. For example, a firmware upgrade of a particular component may have introduced one or more issues. The console may determine, based on a comparison of recently gathered diagnostic information with previously gathered diagnostic information, that the firmware version of the particular component has changed and highlight this change in the graphical representation. Thus, the comparison may enable the technician to identify particular attributes of one or more components that have changed recently and may be causing the issues. Thus, the console enables a technician to view a graphical representation of diagnostic information associated with one or more components of a client system, including a network topology of the client system and a visual representation of each component and their corresponding network connections. If a particular link (e.g., network connection) is working, the link may be displayed using a first color (e.g., green). If the link is encountering intermittent issues or is not operating at full speed (e.g., based on comparing current data with data gathered at a previous point in time), then the link may be displayed using a second color (e.g., yellow). If the link is not operational (e.g., compared to data gathered at a previous point in time), then the link may be displayed using a third color (e.g., red).

The console may enable the technician to drill down (e.g., zoom in) on portions of the client system by selecting a subset (e.g., one or more) of the components of the client system, thereby enabling more diagnostic information about the selected components to be displayed. After selecting the subset of components, the console's user interface may display the selected components and enable a selection of a subset (e.g., one or more) of the attributes associated with the subset of components. The console may re-draw the graphical representation to display the selected (e.g., subset of) components and the selected attributes. For example, the technician may select a server, a storage device, and a networking device as the subset of components. The technician may select attributes A, B, and C associated with the server, attributes D, and E associated with the storage device, and attributes F, G, H, and J associated with the networking device. After selecting a subset of the attributes associated with the selected components, the console may automatically generate a report based on the selected attributes of the selected components. The report enables the technician to view the selected attributes of the selected components to determine possible causes to the issues in the client system.

The console may automatically compare current diagnostic information (e.g., gathered by the agents) with previously gathered diagnostic information and generate a comparison report identifying attributes that have changed more than a predetermined amount. For example, each attribute may have a range of values that are considered a normal range. If a particular attribute has a value that is outside (e.g., either above or below) the normal range, the particular attribute may be visually highlighted (e.g., different font color, highlighter effect, or the like). In some cases, the console may enable the technician to hover a cursor over a particular attribute to display a predetermined number of previous values of the particular attribute.

The console may include a machine learning algorithm to predict one or more recommendations to resolve the issues associated with the client system. For example, the machine learning algorithm may use decision tree learning, association rule learning, artificial neural networks, deep learning, inductive logic programming, support vector machines, clustering, Bayesian networks, representation learning, similarity and metric learning, sparse dictionary learning, rule-based machine learning, learning classifier systems, or the like. For example, the machine learning may use the system configuration information (e.g., components, network topology, and the like) associated with the client system, the attributes associated with each component of the client system, the diagnostic information (e.g., gathered by the agents) associated with the client system, the issues experienced by the client system, or any combination thereof to predict one or more recommended solutions. To illustrate, the machine learning may use historical data gathered from other client systems to identify a subset of the other client systems with the same (or similar) components, having the same (or similar) network topology, having the same (or similar) diagnostic information, and having the same (or similar) issues. After identifying the subset of other client systems, the machine learning may analyze the corresponding solutions used to resolve the issues with the subset of other client systems and predict which of the corresponding solutions are most likely to resolve the issues of the client system. If the machine learning presents more than one recommended solution, the recommended solutions may be ranked based on a confidence percentage, e.g., the first solution is 95% likely to solve the issues, the second solution is 90% likely to solve the issues, and so on.

The machine learning may be trained based on issues encountered by other client systems along with methods and tools that the technicians used to resolve the issues. Each recommendation of the machine learning may include a description of the issues, the solution that was used, and the name of the technician who resolved the issues in the past. This information may enable the technician troubleshooting the client system to discuss the issues with another technician who previously resolved a similar problem for a similarly configured client system. In addition to the name of the technician, information associated with the technician may be provided, such as contact information (e.g., phone number, instant messaging identifier, email address, or the like), experience level (e.g., the number of issues that the technician has resolved, how long the technician has been resolving issues, and the like). In some cases, the machine learning may determine a confidence level for each technician associated with a recommended solution.

As an example, a server may include one or more processors and one or more non-transitory computer readable media storing instructions executable by the one or more processors to perform various operations. For example, the operations may include connecting a console hosted by the server to a client system that is experiencing a particular problem. The operations may include receiving data gathered by one or more agents in the client system. The operations may include displaying a graphical representation of the client system. For example, the graphical representation of the client system may include a plurality of components, a device type (e.g., server, router, switch, or the like) of each component of the plurality of components, a connection between at least a first device and a second device of the plurality of components, and a status (e.g., operational, non-operational, or intermittent) of the connection. For example, the plurality of components may include at least one server, at least one network attached storage device, and at least one of either a network switch or a network router. Each component of the plurality of components may have a corresponding set of attributes. The operations may include receiving a component selection selecting one or more components of the plurality of components, receiving an attribute selection selecting a subset of the set of attributes associated with individual components of the one or more components, and displaying a revised graphical representation of at least a portion of the client system based at least in part on the component selection and the attribute selection. The operations may include performing a comparison of recently gathered data associated with the client system with previously gathered data associated with the client system and providing (e.g., displaying) a comparison report identifying differences between the recently gathered data and the previously gathered data. The operations may include determining data associated with the client system. For example, the data may identify the plurality of components and a network topology of the client system. The operations may include performing a comparison of the data with other data associated with other client systems to determine one or more similar client systems from the other client systems based on the comparison. The operations may include determining a portion of the one or more similar client systems having problems similar to the particular problem. The operations may include determining, by a machine learning module, one or more potential solutions to the particular problem. Each solution of the one or more solutions may correspond to a previously resolved problem that is similar to the particular problem. The operations may include displaying, the one or more solutions. Each solution of the one or more solutions may have an associated confidence level. For example, the confidence level may be determined based on: (i) a similarity of the particular problem of the client system to the previously resolved problem, (ii) a similarity of the plurality of components of the client system to a second plurality of components included in a second client system associated with the previously resolved problem, (iii) a similarity of a network topology of the client system to a second network topology of the second client system associated with the previously resolved problem, or any combination thereof. Each solution of the one or more solutions may identify a technician that resolved the previously resolved problem, an experience level of the technician, and contact information associated with the technician.

FIG. 1 is a block diagram of a system 100 that includes a console connected to a client system, according to some embodiments. The system 100 may include a console 102 (e.g., hosted by one or more servers 146 of a technical support provider) that is capable of connecting to a particular one of multiple client systems 104(1) to 104(P) (P>0) via network 106. For example, each of the client systems 104 may represent an enterprise system of a client (e.g., to which the technical support provider provides support). When a client system, such as the client system 104(P), encounters one or more issues, a client representative may contact a technician and the technician may connect the console 102 to the client system 104(P) to troubleshoot and resolve the issues.

The representative client system 104(P) may include a set of (one or more) components 108(1) to 108(N), such as, for example, network routers, network switches, servers, computers (e.g., laptops, desktops, workstations, and the like), storage devices, and the like. Each of the components 108 may include an identifier (ID), such as a serial number, a service tag, or another type of identifier, that uniquely identifies each of the components 108. For example, the component 108(1) may be associated with the ID 110(1) and the component 108(N) may be associated with the ID 110(N). Each ID 110 may be used by the console 102 to determine information (e.g., configuration, attributes, and the like) associated with the corresponding component 104. Each of the components 108 may have a set of attributes 112. For example, the component 108(1) may have the corresponding attributes 112(1) and the component 108(N) may have the corresponding attributes 112(N). For example, the attributes 112 associated with a server may include a type of processor(s), a firmware version, an operating system version and build, number of processors, clock speed, amount of main memory (random access memory (RAM)), amount of storage, number of ports, type of ports (e.g., Ethernet ports, USB ports, and the like), speed of the ports (e.g., Gigabit Ethernet), and other attributes. As another example, the attributes 112 associated with a network switch or network router may include a firmware version, a type of processor, clock speed, amount of main memory (random access memory (RAM)), number and type of ports (e.g., Ethernet ports), and the like. One or more of the attributes 112 may have an associated status 114. For example, the status 114 of a port attribute 112 may indicate whether the port is functioning properly, e.g., whether the port is successfully transmitting and receiving data packets).

One or more agents 116 (e.g., software agents) may be deployed in each of the client systems 104 to gather data (e.g., logs, the status information 114, and the like). For example, the agents 116 may gather data associated with the client system 104(P) and store the data as gathered data 118. The agents 116 may collect the gathered data 118 (i) periodically (e.g., at a pre-determined time interval, such as every day, every week, every month, or the like), (ii) in response to a request (e.g., sent from the console 102), or (iii) in response to detecting a particular event (e.g., restart or reboot, error log, or the like). The gathered data 118 may include a timestamp indicating when the data was gathered. After collecting the gathered data 118, the agents 116 may send the gathered data 118 to the servers 146. For example, the servers 146 may store the gathered data 118 as one of data 120(1) to 120(M) (M>0). The data 120 may include historical data, e.g., previously gathered data from each of the client systems 104, that spans months or years of data.

The console 102 may provide a user interface (UI) 122, such as a graphical user interface (GUI), in which various information associated with one of the client systems 104 may be displayed. For example, when the console 102 is connected to the client system 104(P), the UI 122 may display a graphical representation 124 of the client system 104(P), including representations of the components 106, as described in more detail in FIG. 2.

The console 102 may enable a user (e.g., a technician) to provide a component selection 126 selecting a subset of the components 106. The console 102 may enable the user to provide an attribute selection 128 selecting a subset (e.g., a portion) of the attributes 112 associated with the subset of the components 106 and their corresponding status 114. The console 102 may generate and display a report 130 based on the component selection 126 and the attribute selection 128. The console 102 thus enables the technician to zoom in on selected aspects of the client system 104 in the report 130 by enabling the technician to select a subset of the components 106 (e.g., using the component selection 126) and select a subset of the attributes 112 (e.g., using the attribute selection 128). In addition, console 102 may re-draw the graphical representation 124 based on the component selection 126 and the attribute selection 128.

For the components 108 of the client system 102 that have issues, the graphical representation 124 may display status information (e.g., icons or the like) based on the attributes 112. The console 102 may automatically compare the most the most recent diagnostic information (e.g., gathered data 118) with previously gathered and uploaded diagnostic information (e.g., data 120) associated with the client system 102 and display comparison information 132. For example, a recent firmware upgrade of a particular of the components 108 may have introduced one or more issues. The console 102 may determine, based on the comparison 132 of the recently gathered diagnostic information (e.g., the gathered data 118) with previously gathered diagnostic information (e.g., the data 120), that the firmware version of the particular component has changed and highlight this change in the graphical representation 124. The comparison 132 may enable the technician to identify particular attributes of one or more components 108 that have changed recently and may be causing the issues. Thus, the console 102 enables a technician to view the graphical representation 124 based on the gathered data 118, including a network topology of the client system 102 and a visual representation of at least some of the components 108 and their corresponding network connections. For example, if a particular link (e.g., network connection) between two of the components 108 is working properly, the link may be displayed using a first color (e.g., green). If the link is encountering intermittent issues or is not operating at full speed (e.g., based on comparing current data with data gathered at a previous point in time), then the link may be displayed using a second color (e.g., yellow). If the link is not operational (e.g., compared to data gathered at a previous point in time), then the link may be displayed using a third color (e.g., red).

The console 102 may include a machine learning (module) 134 to predict one or more recommendations 136 to resolve the issues associated with the client system 104(P). For example, the machine learning 134 may use the gathered data 118 and a database 148 that includes previously solved problems and the associated solutions to make the recommendations 136. The gathered data 118 may include system configuration information (e.g., components 108, network topology, and the like) associated with the client system 104(P), the attributes 112 associated with each of the components 108 of the client system 102, and diagnostic information (e.g., logs, events, such as restarts, and the like) associated with the client system 102 to predict the recommendations 136 (e.g., recommended solutions). The machine learning 134 may use the database 148 and the historical data 120 gathered from each the client systems 104(1) to 104(P) over a period of time to identify a subset of the data 120 that indicates other client systems 104 having components similar to the components 108, having the same (or similar) network topology, having the same (or similar) diagnostic information, and having similar (or the same) problems. After identifying the subset of the data 120, the machine learning 134 may analyze the similar problems 138 (e.g., associated with the client systems 104) and predict which of corresponding solutions 140 are most likely to resolve the issues of the client system 104(P). If the machine learning 134 presents multiple recommendations 136, each of the recommendations 136 may include a rank or a confidence percentage, e.g., the first solution 140(1) is 95% likely to solve the issues, the second solution is 90% likely to solve the issues, and so on.

The machine learning 134 may be trained based on issues encountered by the other client systems 104 along with methods and tools that the technicians used to resolve the issues. Each of the recommendations 136 of the machine learning 134 may include a description of the similar problems 138, the corresponding solutions 140, a name of the technician 142 who resolved the similar problem, and details 144 associated with each of the technicians 142. For example, the similar problem 138(1) may have an associated solution 140(1) that was implemented by the technician 142(1) and the similar problem 138(P) may have an associated solution 140(P) that was implemented by the technician 142(P). This information may enable the technician troubleshooting the client system 104(P) to discuss the issues with other technicians 142 who previously resolved the similar problems 138. The details 144 may include information associated with each of the technicians 142, such as the technician's name, a photograph of the technician, contact information (e.g., phone number, instant messaging identifier, email address, or the like), experience level (e.g., the number of issues that the technician has resolved, how may months the technician has been resolving issues, and the like). The details 144 may include a confidence level (e.g., determined by the machine learning) for each of the technicians 142 associated with a recommended solution 140.

Thus, when a client, such as an enterprise customer, has an issue with their system, the client may contact a technical support provider. A technician at the technical support provider may use a console to connect to the client system. The console may use data gathered by software agents deployed in the client system to display a graphical representation of the client system, including components (e.g., server, router, switch, firewall, and the like) and select attributes (e.g., whether communication links between the components are functioning properly and the like) of the components based on a status of each of the attributes. The console may compare the most recently determined attributes (and their status) with previously determined attributes (e.g., by comparing the gathered data 118 with the data 120) and provide a comparison detailing significant differences (e.g., a storage device is greater than 90% full, a network link that was previously functioning is no longer functioning, or the like), e.g., attributes outside a normal operating range. The console may enable the technician to select a subset of the components and a subset of the attributes to zoom in (e.g., drill down). For example, if a link between two components has issues (e.g., intermittent connection or not functioning), the technician may select the two components and select networking-related attributes to zoom in to the issues. The console may use the information associated with the client system (e.g., configuration, components, issues, and the like) to identify, based on historical data, similar client systems with similar components and similar issues to predict which of the solutions associated with the similar client systems are likely to solve the issues of the client system. Each of the solutions associated with the similar client systems may include information associated with another technician that addressed the issues, including name, contact information, and experience level to enable the technician troubleshooting the client system to contact the other technician to discuss the issues.

Figure 2:
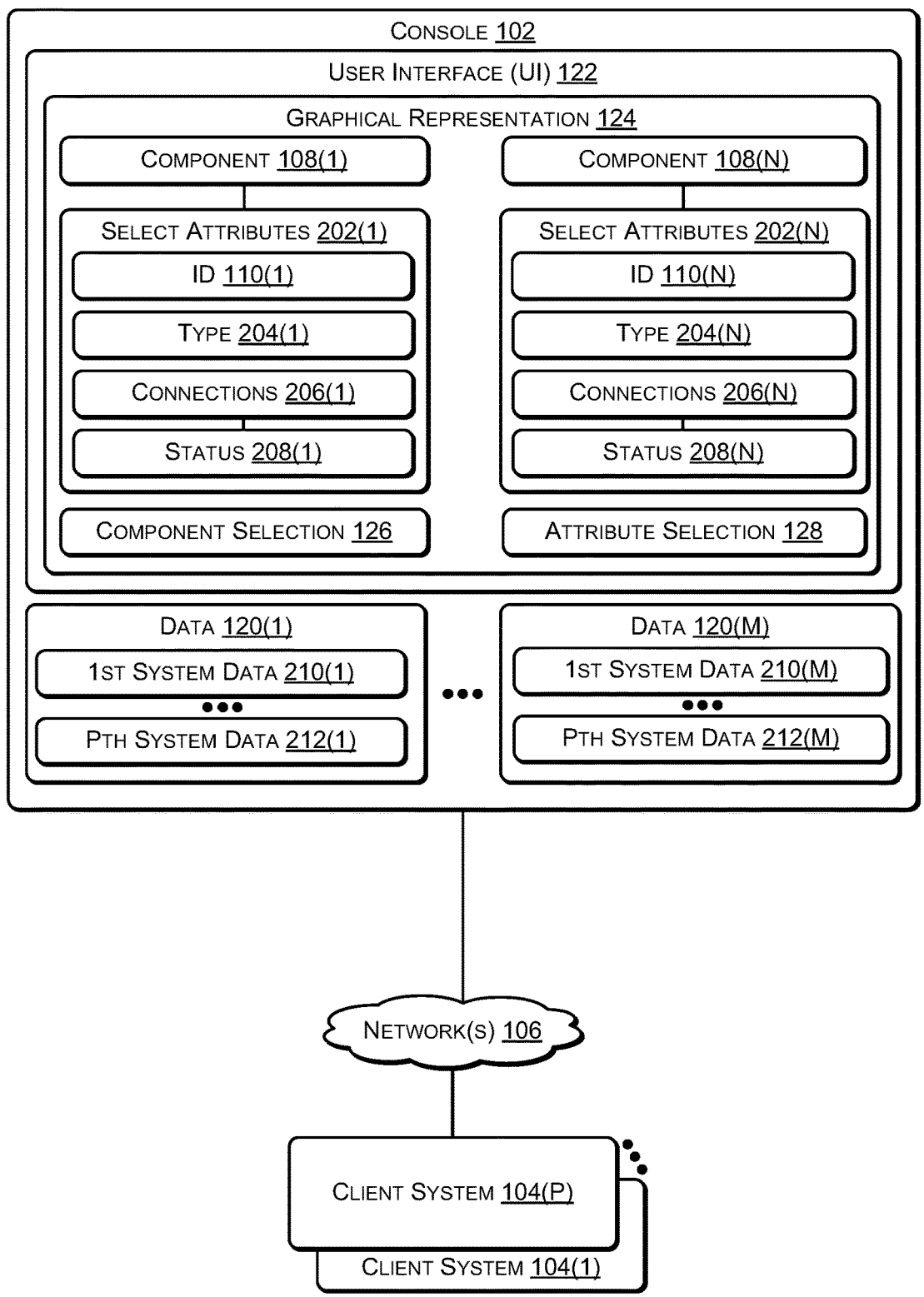
FIG. 2 is a block diagram of a system that includes a console displaying a graphical representation of a client system, according to some embodiments.

FIG. 2 is a block diagram of a system 200 that includes a console displaying a graphical representation of a client system, according to some embodiments. The graphical representation 124 corresponding to the client system 104(P) may display the components 108(1) to 108(N) along with select attributes 202. For example, the component 108(1) may have select attributes 202(1) (e.g., default attributes) and the component 108(N) may have select attributes 202(N). The select attributes 202 may include a unique ID (identifier) 202 (e.g., service tag, serial number, or other identifier that uniquely identifies each of the components 108. The select attributes 202 may include a type 202 (e.g., server, router, switch, or the like) of the corresponding component 108, one or more connections 206 associated with the corresponding component 108, and a status 208 of each of the connections 206. For example, if a particular connection 206 between two of the components 108 is working properly, the status 208 of the particular connection 206 may be displayed using a first color (e.g., green). If the particular connection 206 is encountering intermittent issues or is not operating at full speed (e.g., based on comparing current data with data gathered at a previous point in time), then the status 208 of the particular connection 206 may be displayed using a second color (e.g., yellow). If the particular connection 206 is not operational (e.g., compared to data gathered at a previous point in time), then the status 208 of the particular connection 206 may be displayed using a third color (e.g., red). The user of the console 102 may provide the component selection 126 and the attribute selection to further narrow the components 108 and the select attributes 202 that are displayed. Th attribute selection 128 may override the default attributes 202 that are displayed.

The data 120 may include data gathered from multiple client systems. For example, data 120(1) may include data gathered at a first point in time, with first system data 210(1) associated with the client system 104(1) and Pth system data 212(1) associated with the client system 104(P). Data 120(1) may include data gathered at an Mth point in time (e.g., Mth day, Mth week, Mth month or the like, M>0), with first system data 210(M) associated with the client system 104(1) and Pth system data 212(M) associated with the client system 104(P).

Figure 3:
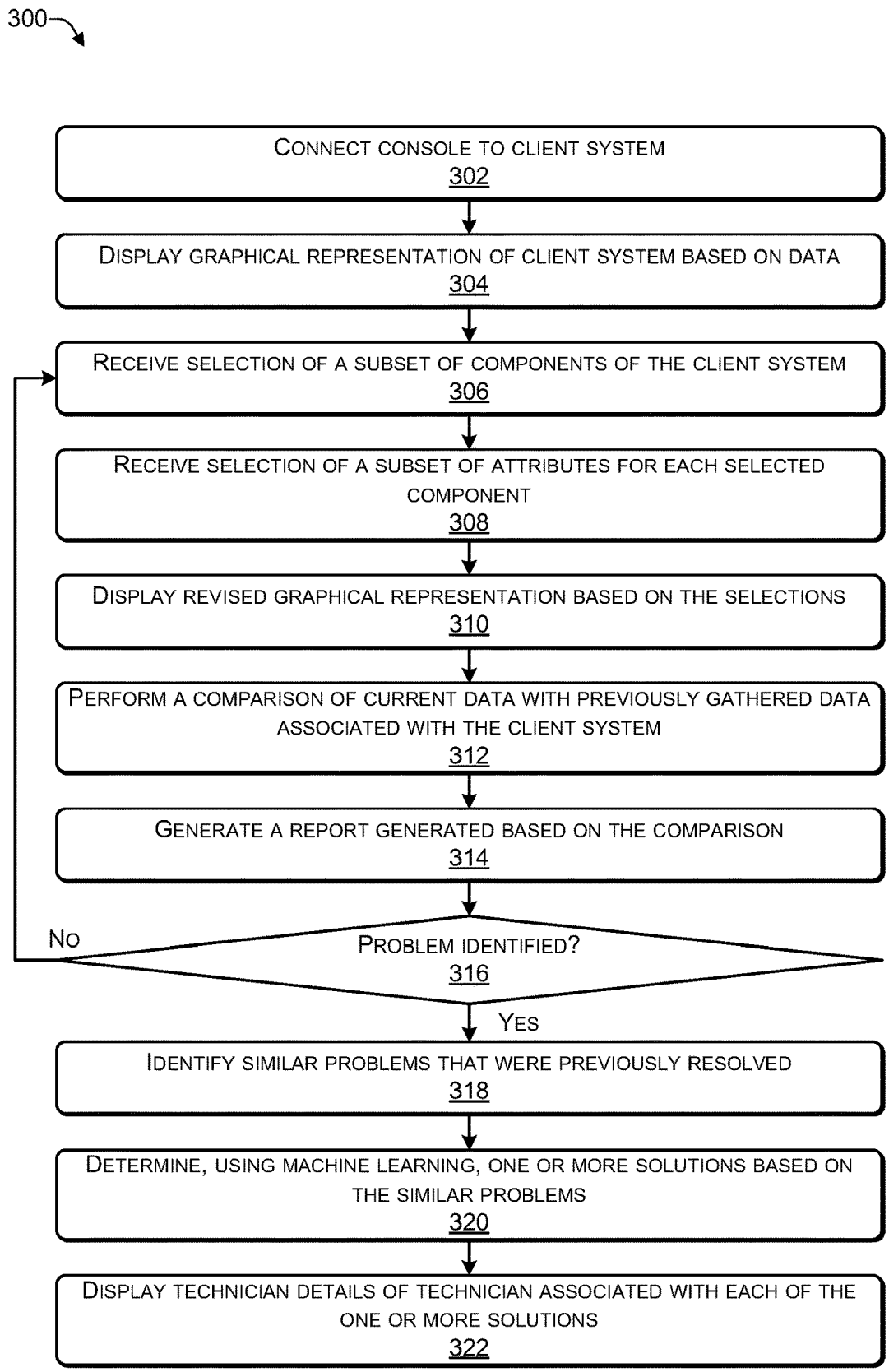
FIG. 3 is a flowchart of a process that includes using machine learning to determine one of more solutions to a problem associated with a client system, according to some embodiments.

In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2, as described above, although other models, frameworks, systems and environments may be used to implement these processes.

FIG. 3 is a flowchart of a process 300 that includes using machine learning to determine one of more solutions to a problem associated with a client system, according to some embodiments. The process 300 may be performed by the console 102 of FIG. 1 and FIG. 2.

At 302, a console may be connected to a client system. For example, in FIG. 1, when the client system 104(P) encounters issues, a client representative may contact a technician and the technician may connect the console 102 to the client system 104(P) to troubleshoot and resolve the issues.

At 304, a graphical representation of the client system may be displayed based on gathered data. For example, in FIG. 2, the console 102 may display the graphical representation 124 corresponding to the client system 104(P). The graphical representation 124 may include the components 108(1) to 108(N) along with select attributes 202 (e.g., default attributes). The select attributes 202 may include a unique ID (identifier) 202 (e.g., service tag, serial number, or other identifier that uniquely identifies each of the components 108. The select attributes 202 may include a type 202 (e.g., server, router, switch, or the like) of the corresponding component 108, one or more connections 206 associated with the corresponding component 108, and a status 208 of each of the connections 206.

At 306, a selection of a subset of components of the client system may be received. At 308, a selection of a subset of attributes may be received for each selected component. At 310, a revised graphical representation may be displayed based on the selections. The console 102 may enable a user (e.g., a technician) to provide the component selection 126 selecting a subset of the components 106. The console 102 may enable the user to provide the attribute selection 128 selecting a subset (e.g., a portion) of the attributes 112 associated with the subset of the components 106. The console 102 may re-draw the graphical representation 124 based on the component selection 126 and the attribute selection 128 to display the selected attributes and the selected components.

At 312, a comparison of current data associated with the client system with previously gathered data may be performed. At 314, a report may be generated based on the comparison. For example, in FIG. 1, the console 102 may automatically compare the most the most recent diagnostic information (e.g., gathered data 118) with previously gathered and uploaded diagnostic information (e.g., portions of the data 120) associated with the client system 102 and display the comparison information 132.

At 316, a determination may be made whether a problem has been identified. If a determination is made, at 316, that the problem has not been identified, then the process may proceed to 306 where a different subset of the components may be selected. For example, in FIG. 1, the console 102 may re-draw the graphical representation 124 based on the component selection 126 and the attribute selection 128 to display the selected attributes and the selected components. The console 102 may automatically compare the most the most recent diagnostic information (e.g., gathered data 118) with previously gathered and uploaded diagnostic information (e.g., portions of the data 120) associated with the client system 102 and display the comparison information 132. If the technician is unable to determine a cause of the issues based on the component selection 126, the attribute selection 128, and the comparison information 132, then the technician may modify the component selection 126, the attribute selection 128, or both.

If a determination is made, at 316, that the problem has been identified, then the process may proceed to 318, where similar problems that were previously resolved are identified. At 320, machine learning may be used to determine (e.g., predict) one or more solutions based on the similar problems. For example, in FIG. 1, if the technician is able to determine a cause of the issues based on the component selection 126, the attribute selection 128, the comparison information 132, or any combination thereof, then the technician may initiate a search of similar problems in the data 120 (e.g., previously gathered data) to identify the similar problems 138. The technician may use the similar problems 138 as input to the machine learning 134 to predict the recommendations 136.

At 322, technician details associated with a technician associated with each of the one or more solutions may be displayed. For example, in FIG. 1, the details 144 associated with each of the technicians 142 who resolved the similar problems 138 in the recommendations 136 may be displayed.

Thus, when a client, such as an enterprise customer, has an issue with an enterprise network (e.g., client system), the client may contact a technical support provider. A technician at the technical support provider may use a console to connect to the client system. The console may use data gathered by software agents deployed in the client system to display a graphical representation of the client system, including components (e.g., server, router, switch, firewall, and the like) and select attributes (e.g., whether communication links between the components are functioning properly and the like) of the components based on a status of each of the attributes. The console may compare the most recently determined attributes (and their status) with previously determined attributes (e.g., by comparing the gathered data 118 with the data 120) and provide a comparison detailing significant differences, e.g., attributes outside a normal operating range. The console may enable the technician to select a subset of the components and a subset of the attributes to zoom in (e.g., drill down). For example, if a link between two components has issues (e.g., intermittent connection or not functioning), the technician may select the two components and select networking-related attributes to zoom in to the issues. The console may use the information associated with the client system (e.g., configuration, components, issues, and the like) to identify, based on historical data, similar client systems with similar components and similar issues to predict which of the solutions associated with the similar client systems are likely to solve the issues of the client system. Each of the solutions associated with the similar client systems may include information associated with another technician that addressed the issues, including name, contact information, and experience level to enable the technician troubleshooting the client system to contact the other technician to discuss the issues.

Figure 4:
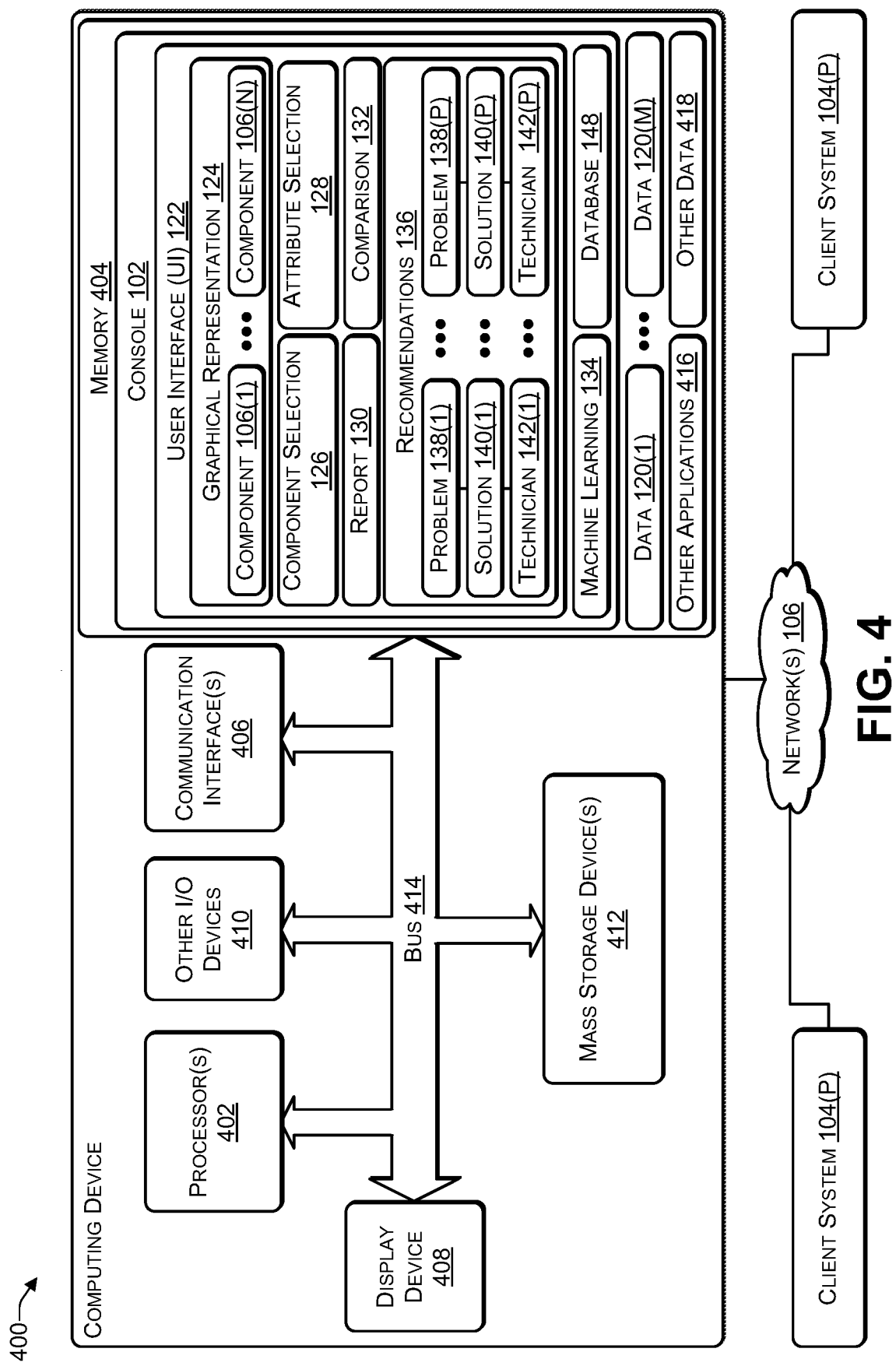
FIG. 4 illustrates an example configuration of a computing device that can be used to implement the systems and techniques described herein.

FIG. 4 illustrates an example configuration of a computing device 400 that can be used to implement the systems and techniques described herein. For example, the computing device 400 may be used to implement the server 146 of FIG. 1.

The computing device 400 may include one or more processors 402 (e.g., CPU, GPU, or the like), a memory 404, communication interfaces 406, a display device 408, other input/output (I/O) devices 410 (e.g., keyboard, trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the software console 102, the data 120, other applications 416, and other data 418.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   displaying, by one or more processors, a graphical representation of a client system experiencing a particular problem, wherein:
      the client system comprises a plurality of components;
      each component of the plurality of components has a corresponding set of attributes; and
      the graphical representation of the client system comprises:
         the plurality of components;
         a device type of each component of the plurality of components;
         a connection between at least a first device and a second device of the plurality of components; and
         a status of the connection;
   performing, by the one or more processors, a comparison of recently gathered data associated with the client system with previously gathered data associated with the client system;
   providing, by the one or more processors, a comparison report identifying differences between the recently gathered data and the previously gathered data based on the comparison;
   determining, by a machine learning module executed by the one or more processors, one or more solutions, each solution of the one or more solutions corresponding to a previously resolved problem that is similar to the particular problem; and
   displaying, by the one or more processors, the one or more solutions, wherein a particular solution of the one or more solutions has an associated confidence level.

2. The method of claim 1, wherein:
   each solution of the one or more solutions identifies a technician that resolved the previously resolved problem, an experience level of the technician, and contact information associated with the technician.

3. The method of claim 1, wherein the confidence level is determined based on:
   a similarity of the particular problem of the client system to the previously resolved problem;
   a similarity of the plurality of components of the client system to a second plurality of components included in a second client system associated with the previously resolved problem; and
   a similarity of a network topology of the client system to a second network topology of the second client system associated with the previously resolved problem.

4. The method of claim 1, further comprising:
   receiving a component selection selecting one or more components of the plurality of components;
   receiving an attribute selection selecting a subset of the corresponding set of attributes associated with individual components of the one or more components; and
   displaying a revised graphical representation of at least a portion of the client system based at least in part on the component selection and the attribute selection.

5. The method of claim 1, wherein the corresponding set of attributes comprises at least one of:
   configuration information;
   one or more error messages;
   a currently installed firmware version;
   a currently installed software version;
   a hardware version;
   one or more installation logs; or
   one or more error logs.

6. The method of claim 1, wherein the plurality of components comprises:
   at least one server;
   at least one network attached storage device; and
   at least one of either a network switch or a network router.

7. The method of claim 1, further comprising:
   determining data associated with the client system, the data identifying the plurality of components and a network topology of the client system;
   performing a comparison of the data with other data associated with other client systems;
   determining one or more similar client systems from the other client systems based on the comparison; and
   determining a portion of the one or more similar client systems having problems similar to the particular problem.

8. A computing device comprising:
   one or more processors; and
   one or more non-transitory computer readable media storing instructions executable by the one or more processors to perform operations comprising:
      displaying a graphical representation of a client system experiencing a particular problem, wherein:
         the client system comprises a plurality of components;
         each component of the plurality of components has a corresponding set of attributes; and
         the graphical representation of the client system comprises:
            the plurality of components;
            a device type of each component of the plurality of components;
            a connection between at least a first device and a second device of the plurality of components; and
            a status of the connection;
      performing a comparison of recently gathered data associated with the client system with previously gathered data associated with the client system;
      providing a comparison report identifying differences between the recently gathered data and the previously gathered data based on the comparison;
      determining, by a machine learning module, one or more solutions, each solution of the one or more solutions corresponding to a previously resolved problem that is similar to the particular problem; and
      displaying the one or more solutions, wherein each solution of the one or more solutions has an associated confidence level.

9. The computing device of claim 8, wherein:
   each solution of the one or more solutions identifies a technician that resolved the previously resolved problem, an experience level of the technician, and contact information associated with the technician.

10. The computing device of claim 8, wherein the confidence level is determined based on:
    a similarity of the particular problem of the client system to the previously resolved problem;
    a similarity of the plurality of components of the client system to a second plurality of components included in a second client system associated with the previously resolved problem; and
    a similarity of a network topology of the client system to a second network topology of the second client system associated with the previously resolved problem.

11. The computing device of claim 8, the operations further comprising:
  receiving a component selection selecting one or more components of the plurality of components;
  receiving an attribute selection selecting a subset of the corresponding set of attributes associated with individual components of the one or more components; and
  displaying a revised graphical representation of at least a portion of the client system based at least in part on the component selection and the attribute selection.

12. The computing device of claim 8, wherein the plurality of components comprises:
  at least one server;
  at least one network attached storage device; and
  at least one of either a network switch or a network router.

13. The computing device of claim 8, the operations further comprising:
  determining data associated with the client system, the data identifying the plurality of components and a network topology of the client system;
  performing a comparison of the data with other data associated with other client systems;
  determining one or more similar client systems from the other client systems based on the comparison; and
  determining a portion of the one or more similar client systems having problems similar to the particular problem.

14. One or more non-transitory computer readable media storing instructions executable by one or more processors to perform operations comprising:
  displaying a graphical representation of a client system experiencing a particular problem, wherein:
    the client system comprises a plurality of components;
    each component of the plurality of components has a corresponding set of attributes; and
    the graphical representation of the client system comprises:
      the plurality of components;
      a device type of each component of the plurality of components;
      a connection between at least a first device and a second device of the plurality of components; and
      a status of the connection;
  performing a comparison of recently gathered data associated with the client system with previously gathered data associated with the client system;
  providing a comparison report identifying differences between the recently gathered data and the previously gathered data based on the comparison;
  determining, by a machine learning module, one or more solutions, each solution of the one or more solutions corresponding to a previously resolved problem that is similar to the particular problem; and
  displaying the one or more solutions, wherein each solution of the one or more solutions has an associated confidence level.

15. The one or more non-transitory computer readable media of claim 14, wherein:
  each solution of the one or more solutions identifies a technician that resolved the previously resolved problem, an experience level of the technician, and contact information associated with the technician.

16. The one or more non-transitory computer readable media of claim 14, wherein the confidence level is determined based on:
  a similarity of the particular problem of the client system to the previously resolved problem;
  a similarity of the plurality of components of the client system to a second plurality of components included in a second client system associated with the previously resolved problem; and
  a similarity of a network topology of the client system to a second network topology of the second client system associated with the previously resolved problem.

17. The one or more non-transitory computer readable media of claim 14, the operations further comprising:
  receiving a component selection selecting one or more components of the plurality of components;
  receiving an attribute selection selecting a subset of the corresponding set of attributes associated with individual components of the one or more components; and
  displaying, by the one or more processors, a revised graphical representation of at least a portion of the client system based at least in part on the component selection and the attribute selection.

18. The one or more non-transitory computer readable media of claim 14, wherein the graphical representation of the client system comprises:
  a network topology of the client system.

19. The one or more non-transitory computer readable media of claim 14, wherein the plurality of components comprises:
  at least one server;
  at least one network attached storage device; and
  at least one of either a network switch or a network router.

20. The one or more non-transitory computer readable media of claim 14, the operations further comprising:
  determining data associated with the client system, the data identifying the plurality of components and a network topology of the client system;
  performing a comparison of the data with other data associated with other client systems;
  determining one or more similar client systems from the other client systems based on the comparison; and
  determining a portion of the one or more similar client systems having problems similar to the particular problem.

* * * * *